UNITED STATES PATENT OFFICE.

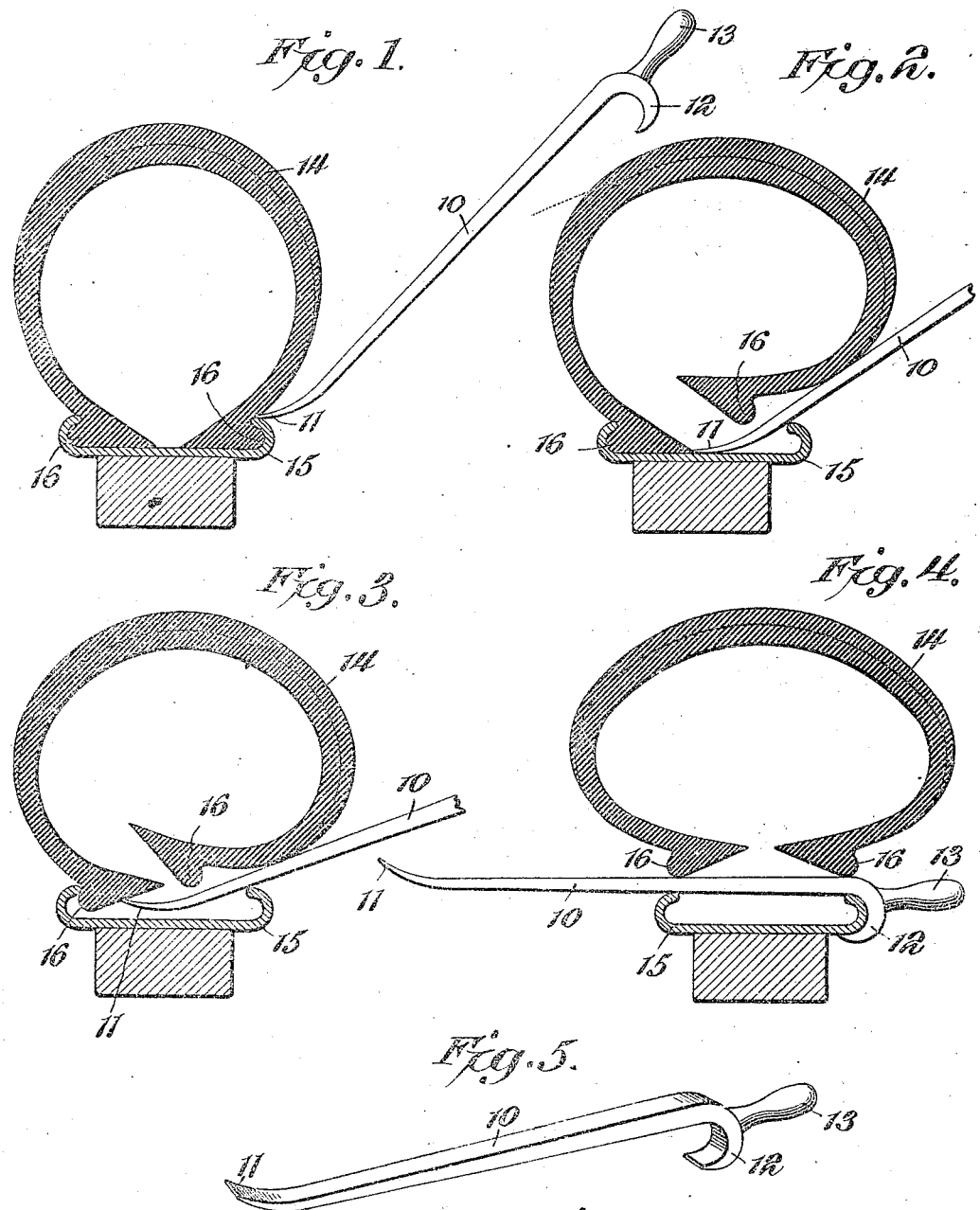

MINOR WATERS, OF NEW ALBANY, INDIANA.

TIRE-HANDLING TOOL.

1,206,084.

Specification of Letters Patent.

Patented Nov. 28, 1916.

Application filed October 26, 1915. Serial No. 57,989.

*To all whom it may concern:*

Be it known that I, MINOR WATERS, a citizen of the United States, residing at New Albany, in the county of Floyd and State of Indiana, have invented a new and useful Tire-Handling Tool, of which the following is a specification.

This invention relates to an improved tool for use in removing and replacing tires on clencher rims, and has for an object to provide a simple tool by the use of which less labor is required in the removal of the tire from the rim, and also the removal and replacement of the tire may be done in a relatively short time.

Another object of the invention is to provide a tool which is of such construction that the bead of the tire casing may be readily dislodged from beneath the clencher flange by a relatively slight pressure on the handle or outer end of the tool, and wherein the tool may be further operated by a slight additional pressure for placing the tool beneath both beads of the casing, and across the rim so that the opposite ends of the tool may be grasped in the hands and drawn circumferentially around the wheel to entirely dislodge the tire from the rim.

The above and other advantages and objects of this invention will be more clearly brought out in the following description of the present preferred embodiment of this invention, the same being disclosed in the accompanying drawing, wherein:

Figure 1 is a transverse section through a tire or casing in position on a clencher rim, the improved tool being shown in its initial position prior to the application of pressure against the tool. Fig. 2 is a similar view showing the position of the tool after dislodging the outer bead from the clencher rim. Fig. 3 is a like view showing the position of the improved tool dislodging the inner bead from the clencher rim. Fig. 4 is a similar view showing the final position of the tool, wherein the blade or shank thereof extends entirely across the inner side of the casing and against the rim, the tool being in position to be grasped by the hands for the removal of the tire. Fig. 5 is a perspective view of the improved tool.

Referring to the drawing, wherein like parts are designated by similar characters of reference throughout the several views, and referring particularly to Fig. 5 of the drawing, the numeral 10 designates the blade or shank of the tool, which tapers in thickness from its inner to its outer end, is relatively flat throughout its length, and terminates at its outer end in a lip 11, which is slightly upturned, as shown, for a purpose which will hereinafter appear. The blade or shank 10 is substantially straight, as shown, and terminates at its inner end in an underturned curved hook 12, which is slightly tapered toward its end. It will be noted that the lip 11 and the bill of the hook 12 taper to a relatively thin edge to admit of the insertion of the tool beneath the beads of the casing and in other crevices found necessary in the handling of the tool. The blade or shank 10 is provided with a handle 13 which projects rearwardly from the outer side of the hook 12 between the free end and the base of the hook so that the latter is in offset relation to the shank but is in substantial parallelism therewith. It will thus be noted that the handle 13 is in position to receive pressure when using the blade or shank 10, or in using the hook 12 when drawing the tool edgewise around the wheel between the casing and the rim.

In using the tool, the same is grasped in the hands and the lip 11 is forced against the outer side of the casing 14 at the top of the adjacent flange of the clencher rim 15, as shown in Fig. 1. Pressure exerted longitudinally upon the blade or shank 10 compresses the casing 14 and raises the bead 16 of the casing from beneath the outer flange of the clencher rim, as shown in Fig. 2. The blade 10 is further forced inwardly, and is slightly raised to engage the lip 11 beneath the opposite or inner side of the casing. The handle 13 is now forced downwardly to swing the shank 10 about the outer flange of the clencher rim 15 as a fulcrum, to raise the lip 11 against the inner bead 16 of the casing 14 and dislodge the inner bead from the inner flange of the clencher rim, as is shown in Fig. 3. As soon as both of the beads 16 of the casing are raised out of engagement with the clencher rim 15, the tool is forced inwardly between the casing and the rim to engage the hook 12 about the outer flange of the rim, as shown in Fig. 4, and to thus dispose the handle 13 at one side of the tire or casing and the outer end of the blade or shank 10 at the opposite side of the casing. When in this position, as shown in Fig. 4, the opposite ends of the tool are grasped in the hands, and the tool is drawn circumferentially about the wheel to gradually raise the beads 16 of the casing out of engagement with the rim flanges entirely around the rim. The blade 10 may now be swung upwardly about the hook 12 as a pivot, and the casing 14 slid laterally from the rim over the handle 13. The handle 13 is offset downwardly from the blade 10 to permit of the free passage of the tire from the enlarged end of the blade and also to provide sufficient space for the hand beneath the tire.

The hook 12 is curved, or conforms to the configuration of the side of the rim 15, so that the hook serves as a positive stop to prevent the driving of the blade 10 too far in between the rim and the tire. This form of hook also provides a guide for the tool to hold it in its true transverse position beneath the tire when the tool is grasped at its opposite ends in the hands and drawn circumferentially over the rim. The hook 12 engages beneath the rim 15 so as to serve also as a means of holding the tool from accidental and sudden release from the rim when the tire is suddenly released from the rim.

It will be readily understood that in replacing a tire upon the rim, it is only necessary to place the tool on the rim in the reverse position from that shown in Fig. 4, or with the hook 12 engaging the inner side of the rim. Then loop the casing over the blade 10, raise the outer end of the tool and slide the casing into registry with the rim, gradually draw the tool circumferentially about the wheel, and slide the casing laterally into alinement with the rim until the entire casing registers therewith. The tool may now be withdrawn and the elasticity of the casing draws the beads 16 into proper position beneath the opposite flanges of the clencher rim.

The handle 13 affords means for firmly grasping the inner end of the tool when the hook 12 is resting against the side of the rim 15, and also serves as a means for forcing the blade 10 forwardly when collapsing the casing, as shown in Figs. 2 and 3.

What is claimed is:

A tool for removing and replacing a tire, comprising a shank having at one end an engaging lip and at its opposite end a curved hook which is adapted to embrace and fit the side and bottom of the rim of a wheel and serve as a guide and stop, the portion of the shank between the lip and the hook being straight and flat on both faces, so as to allow the insertion of the tool transversely between the rim and the tire, and a substantially straight handle extending outwardly from the outer side of the hook at a point between the free end of the hook and the base thereof thereby offsetting the handle below the plane of the shank, the end of the shank having the engaging lip and the handle being grasped in drawing the tool around the rim.

In testimony, that I claim the foregoing as my own, I have hereto affixed my signature in the presence of two witnesses.

MINOR WATERS.

Witnesses:
  EDWARD BURKE,
  THOS. MEANY, Jr.